United States Patent [19]

Yang

[11] Patent Number: 4,658,485

[45] Date of Patent: Apr. 21, 1987

[54] MACHINE TOOL WITH ARTICULATED CROSSBEAM

[76] Inventor: Tai-Her Yang, 5-1 Taipin St., Si-Hu Town, Dzan-Hwa, Taiwan

[21] Appl. No.: 768,724

[22] Filed: Aug. 23, 1985

Related U.S. Application Data

[63] Continuation-in-part of Ser. No. 643,092, Aug. 21, 1984, abandoned, which is a continuation of Ser. No. 400,225, Jul. 20, 1982, abandoned.

[51] Int. Cl.[4] .......................... B23C 1/12; B23D 1/14; B23B 39/14
[52] U.S. Cl. ................ 29/26 A; 51/166 R; 408/236; 409/202; 409/235
[58] Field of Search ............ 409/202, 236, 235, 337, 409/348, 201, 204, 206, 211, 212, 199; 29/26 A, 26 R, 39; 82/19; 51/166 R, 166, 166 MH; 408/237, 236, 234

[56] References Cited

U.S. PATENT DOCUMENTS

| | | | |
|---|---|---|---|
| 2,499,842 | 3/1950 | Armitage | 409/199 |
| 2,911,764 | 11/1959 | Steggeman | 51/166.7 |
| 3,039,236 | 6/1962 | Thiel et al. | 51/166 R X |
| 3,295,261 | 1/1967 | Murphy | 51/166.75 X |
| 3,668,971 | 6/1972 | Dever | 409/202 X |
| 3,823,645 | 7/1974 | Sukhov et al. | 409/202 X |
| 4,187,601 | 2/1980 | Aldrin | 29/26 R X |

FOREIGN PATENT DOCUMENTS

| | | | |
|---|---|---|---|
| 171774 | 12/1951 | Austria | 51/166 MH |
| 106595 | 4/1984 | European Pat. Off. | 29/39 |
| 829709 | 1/1952 | Fed. Rep. of Germany | 51/166 MH |
| 3136396 | 3/1983 | Fed. Rep. of Germany | 51/166 R |
| 870011 | 10/1981 | U.S.S.R. | 409/235 |

Primary Examiner—William R. Briggs
Attorney, Agent, or Firm—Leonard Bloom

[57] ABSTRACT

A machine tool is equipped with a fully articulatable crossbeam arranged between a pair of vertical columns. The crossbeam carries a tool carriage or saddle which is provided with a driven cutting tool element. The cutting tool element engages a workpiece clamped on a table between the columns and below the crossbeam. The crossbeam may articulate in mutually perpendicular planes, independently thereof. With this feature, the machine tool is flexible and versatile and may be used by semi-skilled operators with a minimum of training to perform a series of intricate operations easily and conveniently.

17 Claims, 16 Drawing Figures

MACHINE TOOL WITH ARTICULATED CROSSBEAM

CROSS REFERENCE TO RELATED APPLICATIONS

This application is a continuation-in-part of co-pending application Ser. No. 643,092, filed Aug. 21, 1984, now abandoned which in turn is a continuation of application Ser. No. 400,225, filed Jul. 20, 1982, now abandoned the disclosures of which are incorporated herein by their entirety.

FIELD OF THE INVENTION

The present invention relates to a machine tool of the type equipped with a crossbeam means, and more particularly, to a machine tool that is flexible and may be readily articulated to perform a variety of operations on a workpiece.

BACKGROUND OF THE INVENTION

In the prior art, of which I am aware, there have been several disclosures of a machine tool possessing the capability of machining a workpiece having a face, the plane of which is inclined with respect to the plane of the working table. This prior art may be reviewed, briefly, as follows:

McConnell, et al U.S. Pat. No. 3,983,765 discloses a machine tool capable of machining the end of a right circular cylinder in order to produce a compound curvature corresponding to the compound curvature of intersection between one right cylinder and a second larger right cylinder.

Romeu U.S Pat. No. 3,998,122 discloses a machine tool equipped with a working table pivotable about an axis lying above the working surface of the table and in the longitudinal plane of symmetry of the table, the tool being moveable longitudinally in a direction parallel to its pivot a axis.

Turrettini U.S. Pat. No. 2,564,180 discloses a machine tool with multiple tool casings oriented upon different axes in order to work various faces of the workpiece.

Foster U.S. Pat. No. 2,942,509 discloses a machine possessing a spherical turning device which, constitutes an attachment to a vertical boring mill and which allows internal and external spherical turning of a workpiece to be accomplished.

Finally, Yasuda, Japanese Appl. No. 50-107566, discloses a machine tool having a tool element for continuously performing a cutting operation.

All the devices resorted to in the prior art have several disadvantages. First, they all involve machines which possess such substantial modifications from the machine tools commonly utilized so as to require an individual to receive specialized training and to possess specialized skills for their operation. Familiarity and training with conventional machine tools will not suffice. Secondly, they all involve machines so highly specialized and intricate so as to require highly specialized and modified parts which are expensive and not readily available to the user. Thus, if such a part fails, unless the user has one in reserve, considerable "down" time results.

Each of these machines are further disadvantageous in that they are costly and are of great mass and bulk, thereby limiting their utility.

Furthermore, those machines which possess rotatable working tables require direct attachment of the workpiece to the table which, in practice, is possible only in a few simple cases where the surface to be machined has a width less than the diameter or the height of the tool machine employed.

Finally, the machine tools of the prior art are not readily articulatable and lack a desired degree of flexibility for performing a variety of machining operations easily and conveniently.

Accordingly, there exists a present need for a machine tool which is readily articulatable, and which possesses the ability to machine faces of a workpiece, the plane of which may be inclined with respect to the plane of the working table.

SUMMARY OF THE INVENTION

Accordingly, it is the primary objective of the present invention to alleviate the disadvantages and deficiencies of the prior art by providing a machine tool which possesses a crossbeam that is readily articulatable, so that the tool holder casing may be readily oriented in any direction in space.

It is another object of the present invention to provide an articulatable machine tool which is available at reasonable cost, is simple, and is of a design not so radically different from conventional machine tools widely used, thereby obviating any requirement for intricate parts or for an operator who possesses specialized training or skills for its operation.

It is a further objective of the present invention to provide a machine tool whose tool holder casing permits the axes of the cutting tool to be oriented vertically or horizontally with respect to the inclined face of the piece to be worked.

In accordance with the teachings of the present invention, a preferred embodiment is herein illustrated and described, wherein a machine tool is provided, including a frame having a pair of vertical columns, the columns being positioned substantially parallel to each other. A carrier block is mounted for sliding movement along a first vertical axis on each of the columns. A means is provided for vertically adjusting each carrier block on its respective column. A slide block is mounted for sliding movement in each of the carrier blocks about a second axis which is horizontal and perpendicular to the first axis. A longitudinal crossbeam means having respective end portions is disposed between the pair of vertical columns. A first universal joint is positioned between one of the end portions of the crossbeam means and one of the slide blocks. A second universal joint is positioned between the other end of the crossbeam means and the other slide block. With this arrangement, the crossbeam means may articulate between the respective carrier blocks and between the pair of vertical columns. A tool saddle is carried by the crossbeam means for sliding movement longitudinally thereof. Means are provided for adjusting the longitudinal position of the tool saddle relative to the crossbeam means. The tool saddle carries a tool element for engagement with a workpiece, and suitable means are provided for driving the tool element.

In accordance with the further teachings of the present invention, the machine tool is provided with a bridge joining the respective upper portions of the vertical columns, thereby providing additional rigidity to the overall structure.

Preferably, each of the vertical columns is provided with two raised parallel guide surfaces and a center recess therebetween, and the respective carrier block is guided on the guide surfaces and has a central portion received within the center recess. At least one vertical guide rod is received in the center recess and passes through the carrier block, and a vertical worm screw is disposed within the center recess and engages the carrier block for vertically adjusting the carrier block on its respective column.

Preferably, the means for adjusting the longitudinal position of the tool saddle on the crossbeam includes at least are longitudinal guide rods and further includes a worm screw carried by the crossbeam and engaging the tool saddle. The longitudinal crossbeam may be provided with a contractile structure positioned on at least one end, and preferably both ends, thereof. This contractile structure may include a dovetail arrangement, such that the contractile structure is secured to the crossbeam means for sliding movement thereon.

Broadly stated, the present invention constitutes an improvement to a machine tool having a pair of vertical columns, a horizontal crossbeam therebetween, a tool saddle carried by the crossbeam, and a cutting tool element carried by the tool saddle for engaging a workpiece supported on a table positioned between the columns; and the improvement includes a means for articulating the crossbeam and hence the tool saddle and the cutting tool element carried hereby, relative to the vertical columns, and in mutually perpendicular horizontal and vertical planes independently thereof.

Other variations of the preferred embodiment of this invention, and other devices useful in conjunction with the present invention, are also disclosed herein.

These and other objects of the present invention will become apparent from a reading of the following specification taken in conjunction with the enclosed drawings.

BRIEF DESCRIPTION OF THE DRAWINGS

FIG. 5-1 is a preferred embodiment of the present invention, showing a tool saddle mounted on an articulatable crossbeam in a modified machine tool.

FIG. 5-2 is a top plan view of the embodiment of FIG. 5-1, drawn to a reduced size.

DESCRIPTION OF PREFERRED EMBODIMENTS

Figures 1, 5:
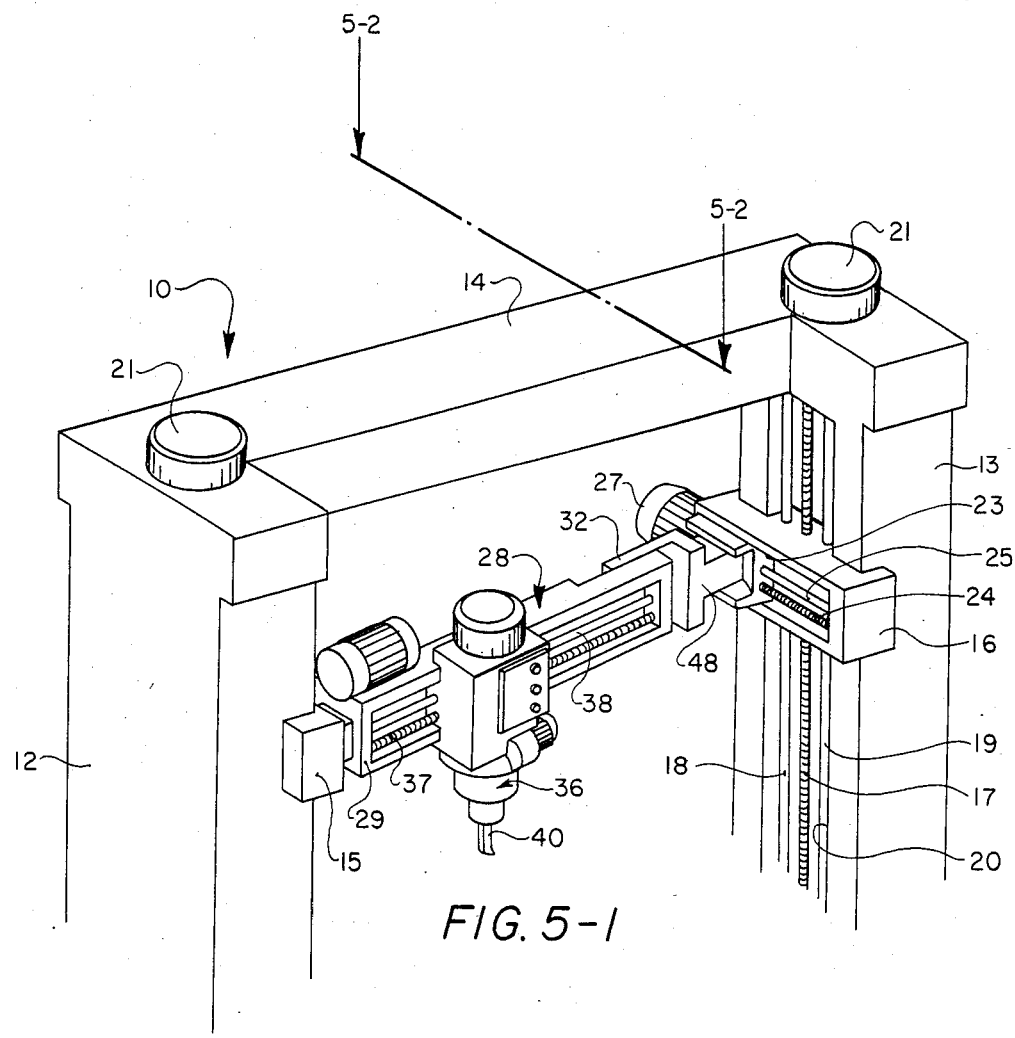
Figures 2, 5:
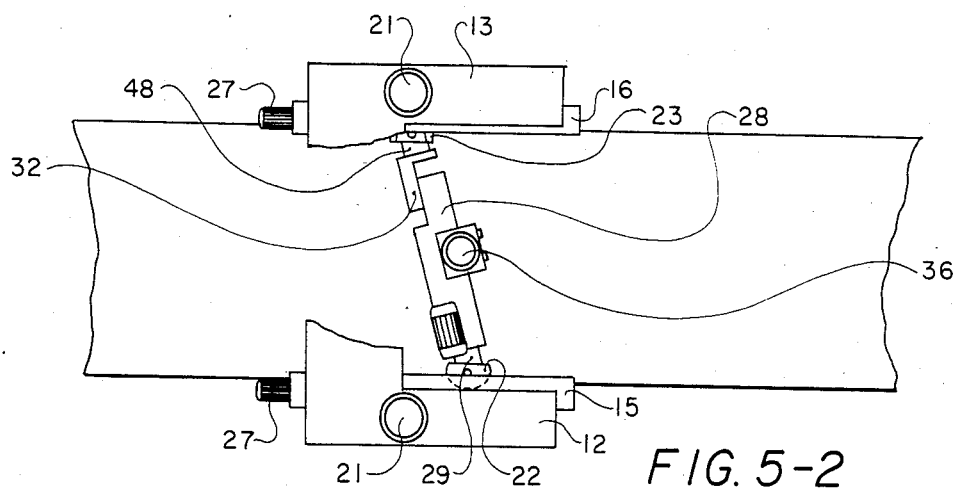
Figure 6:
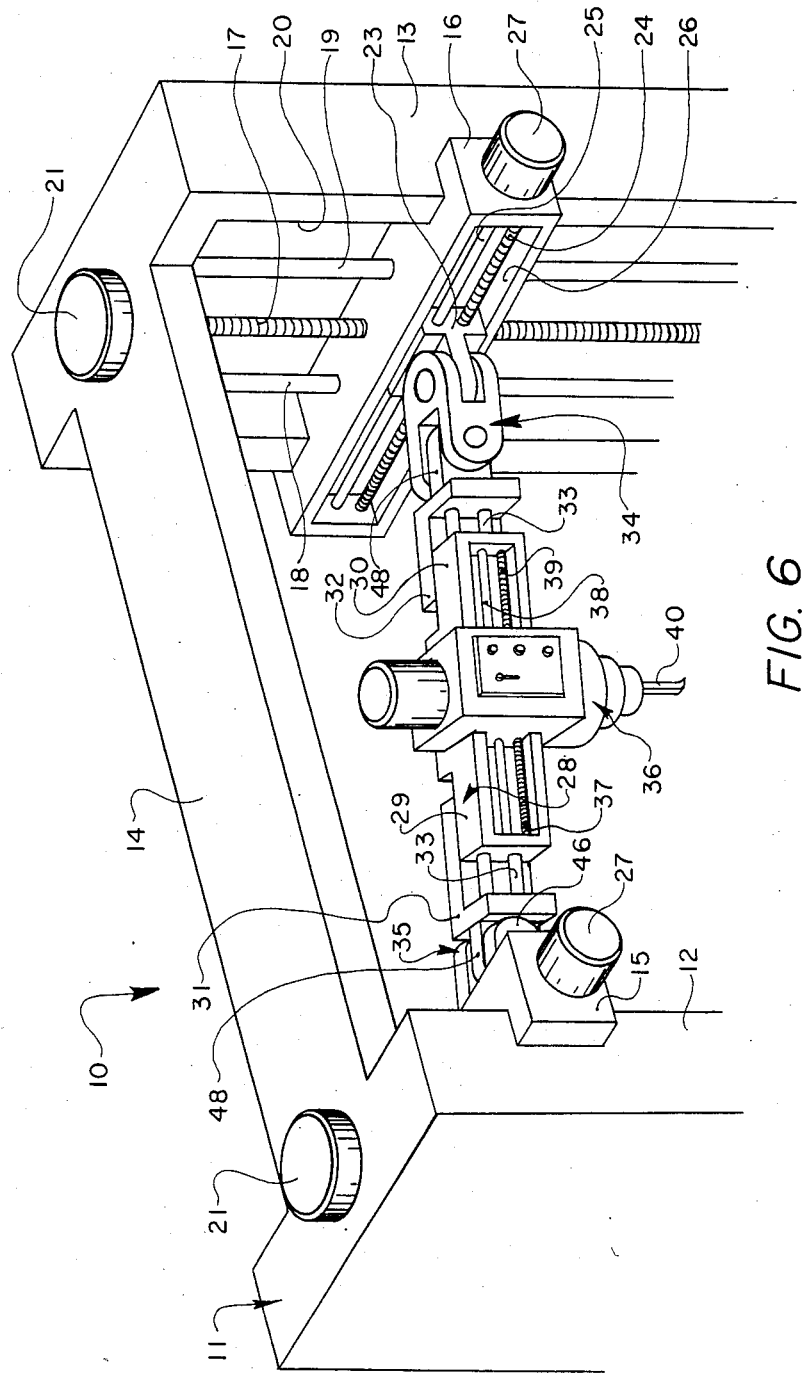
FIG. 6 is a perspective, corresponding substantially to FIG. 5-1, but drawn to an enlarged scale, showing the articulated crossbeam in an alternate position, and further showing the crossbeam mounted by respective universal joints carried on the ends of the crossbeam.

With reference to the drawings, and with particular reference to FIGS. 5-1, 5-2, 6 and 7 thereof, there is illustrated a machine tool 10 equipped with and the readily articulatable crossbeam means of the present invention. Preferably, the crossbeam is symmetrical as shown in FIG. 6.

With reference to FIG. 6, the machine tool 10 is provided with a frame 11 having a pair of vertical columns 12 and 13, positioned substantially parallel to each other. In this embodiment, the frame is further provided with a horizontal bridge 14 disposed between the vertical columns 12 and 13, thereby providing further rigidity to the frame.

A pair of carrier blocks 15 and 16 are provided. Each of these carrier blocks are mounted for sliding movement along a first vertical axis on the columns 12 and 13. Means are provided for vertically adjusting each carrier block on its respective column. In the preferred embodiment, this means includes a worm screw 17 and a pair of vertical guide rails 18 and 19 positioned about the worm screw 17 and secured within a recess 20 in columns 12 and 13. Means, such as knob 21, also provided to turn the worm screw to vertically adjust the respective carrier block.

A slide block 22 and 23 is mounted for sliding movement in each of the carrier blocks 15 and 16, respectively, along a second axis which is horizontal and perpendicular to the first vertical axis of the columns. Means are provided for horizontally adjusting each slide block 22 and 23 on its respective carrier block 15 and 16. In the preferred embodiment, this means includes a worm screw 24 and a guide bar 25 positioned parallel to the worm screw 24 and secured within a recess 26 in the carrier block 15, 16, as shown in FIG. 6. Means, such as a knob 27, is provided to turn the respective worm screw to horizontally adjust the respective slide block in its carrier block.

A horizontal crossbeam 28 is disposed between the vertical columns 12 and 13. This crossbeam 28 has respective end portions 29 and 30. In the preferred embodiment, respective contractile structures 31 and 32 are provided, which are carried by the crossbeam by means of a dovetail connection 33, as shown more clearly in FIG. 7.

Figure 7:
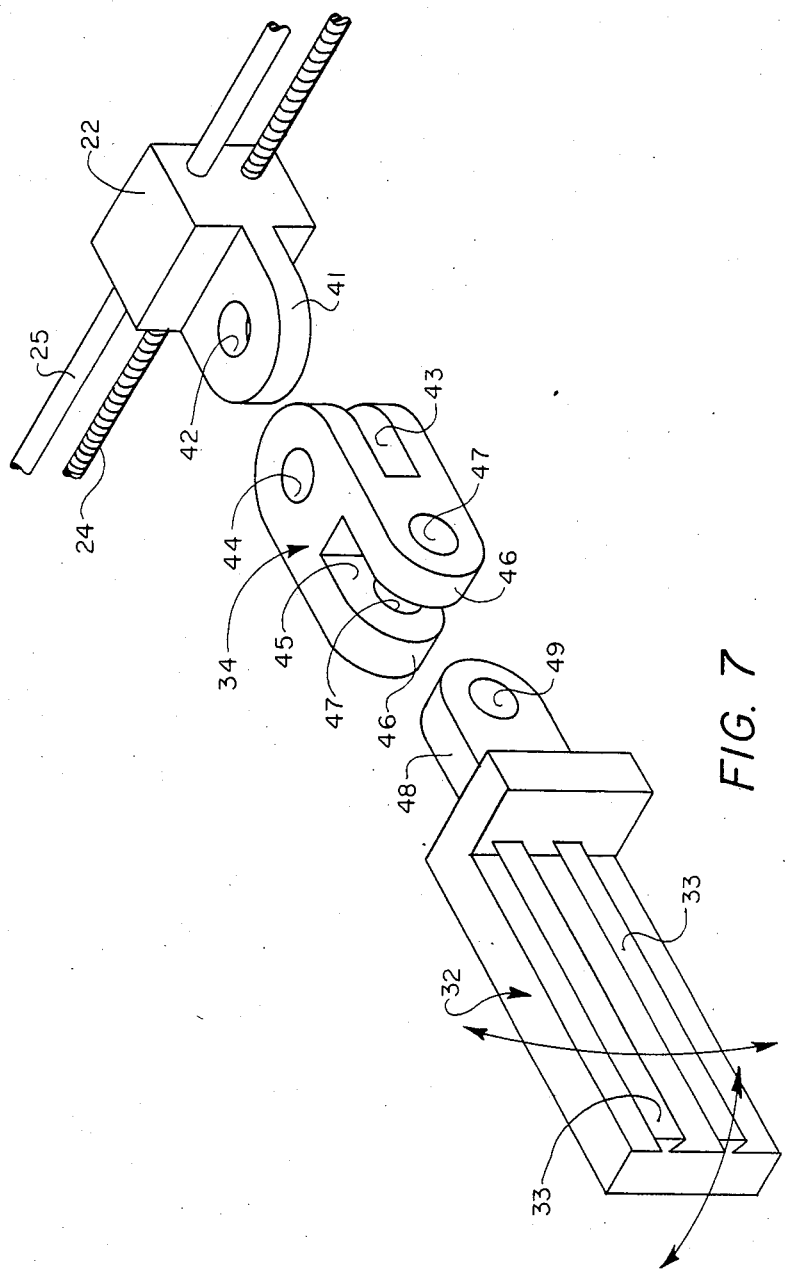
FIG 7. an exploded perspective of a portion of the crossbeam, corresponding slide block, and respective universal joint therebetween, as used with the articulatable machine tool shown in FIG. 6.

A first universal joint 34 is positioned between one of the end portions of the crossbeam 28 and one of the slide blocks, as for example, slide block 22 in FIGS. 6 and 7.

A second universal joint 35 is positioned between the other end portion of the crossbeam 28 and the other slide block 23. In this manner, the crossbeam may articulate between the respective carrier blocks 15 and 16.

A tool saddle 36 is mounted for longitudinal sliding movement on the crossbeam 28. In the preferred embodiment, this tool saddle is mounted on a worm screw 37, and a parallel guide bar 38 is positioned and secured within a recess 39 of the crossbeam.

A cutting tool element 40 is carried by the tool saddle 36 for engagement with a workpiece (not shown in FIG. 6). Means are also provided for driving the tool element 40 and the tool saddle 36.

Figure 1:
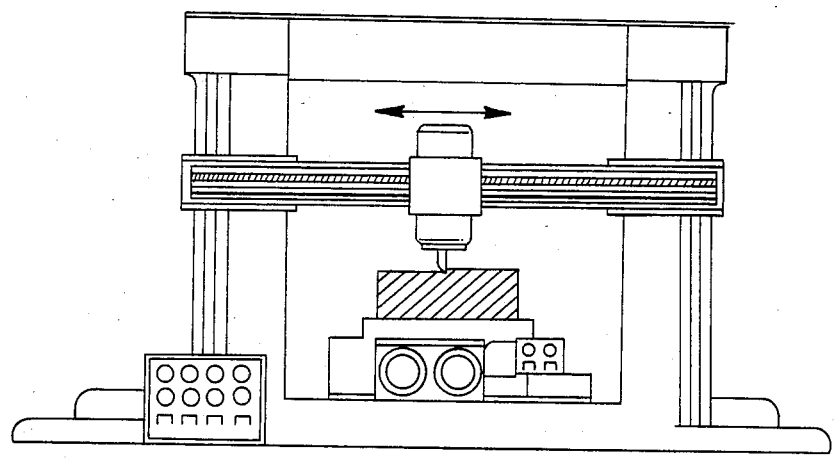
FIG. 1 is a front elevation of a conventional machine tool heretofore resorted to the prior art.
Figure 2:
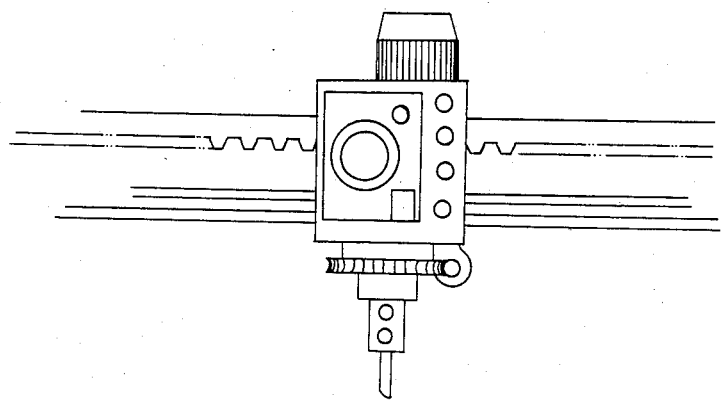
FIG. 2 is the front elevation of a tool saddle and cutting tool element carried on a horizontal crossbeam useful in connection with the present invention.
Figure 3:
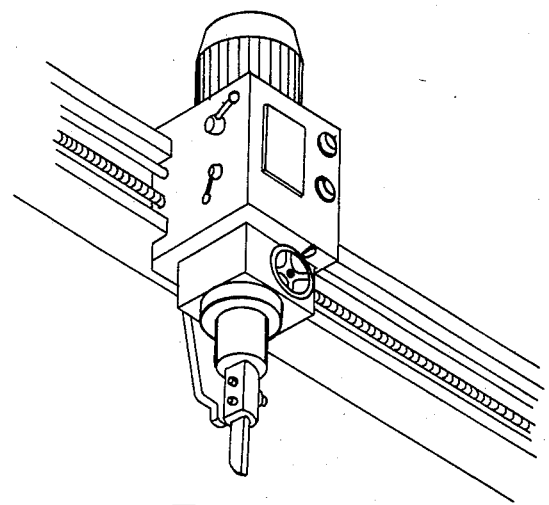
FIG. 3 is a perspective of a tool saddle mounted on the crossbeam, viewed from the underside thereof.
Figure 4:
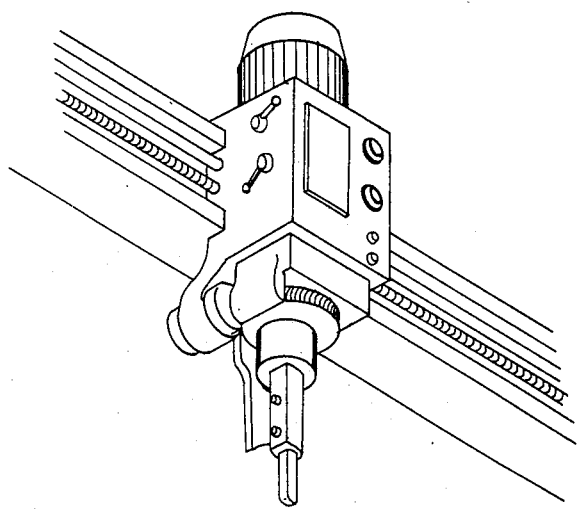
FIG. 4 is a perspective of another tool saddle mounted on the crossbeam viewed from the underside thereof.

With reference to FIGS. 5-1 and 5-2 there is shown another embodiment of the articulated machine tool of the instant invention. In this embodiment, one end portion of the crossbeam means 28 is secured to a contractile structure (hereinafter described), and the universal joints 15a and 15b are not provided. The end portions of the crossbeam means 11 are connected directly to their respective slide blocks.

With reference again to FIG. 7, the slide block 22 has a horizontal tongue 41 provided with a vertical hole 42. The tongue is received in the horizontal slot 43 formed in the adjacent bifurcated end of the universal joint 34. The bifurcated end of the universal joint has a vertical hole 44, and a pin (not shown) is received in the holes 42 and 44, thereby pivotably supporting the universal joint for movement in a horizontal plane and about the vertical axis of the cooperating aligned holes 42 and 44. The other end of the universal joint is bifurcated to form a vertical slot 45. The legs 46 of the bifurcated end of the universal joint have aligned horizontal holes 47. The end portion of the dovetailed contractile structure 32 on the crossbeam is provided with a vertical tongue 48 which is received in the slot 45. The vertical tongue has a hole 49 aligned with the holes 47, and a pin (not shown) is received in the cooperating aligned holes.

In this manner, the end of the crossbeam may pivot in a vertical plane and about a horizontal axis. With this arrangement, the crossbeam may pivot both horizontally and vertically, independently, and in mutually perpendicular planes relative to the vertical columns of the machine tool.

This universal articulation of the crossbeam, and hence the tool saddle and cutting element carried thereby, provides a high degree of flexibility and versatility, allowing the machine tool so equipped thereby to be used by semi-skilled operators to perform a variety of machining operations easily and conveniently on the same machine.

Additionally, the crossbeam has a built-in contractile structure, such that the end portion of the crossbeam are slidably mounted on the universal joint and by the dovetail connection, thereby providing additional flexibility in the articulation of the crossbeam and hence in the operation of the overall machine tool.

Figure 8:
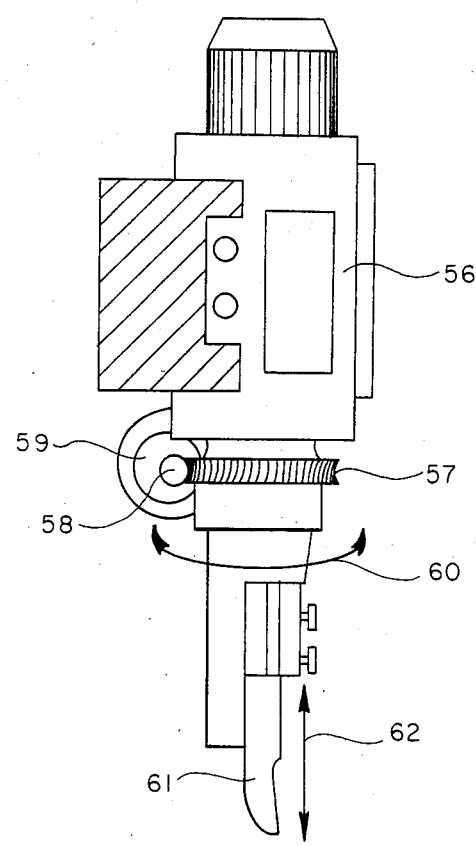
FIG. 8 is a front elevation of a tool saddle, corresponding substantially to that of FIG. 2.

With reference to FIG. 8, the tool saddle 56 has a worm wheel 57 engaging a worm 58 driven by a reversible motor 59. In this manner, the tool saddle 56 may rotate or oscillate as indicated by the arrows 60. The cutting tool element 61 may move as indicated by the arrows 62.

Figure 9:
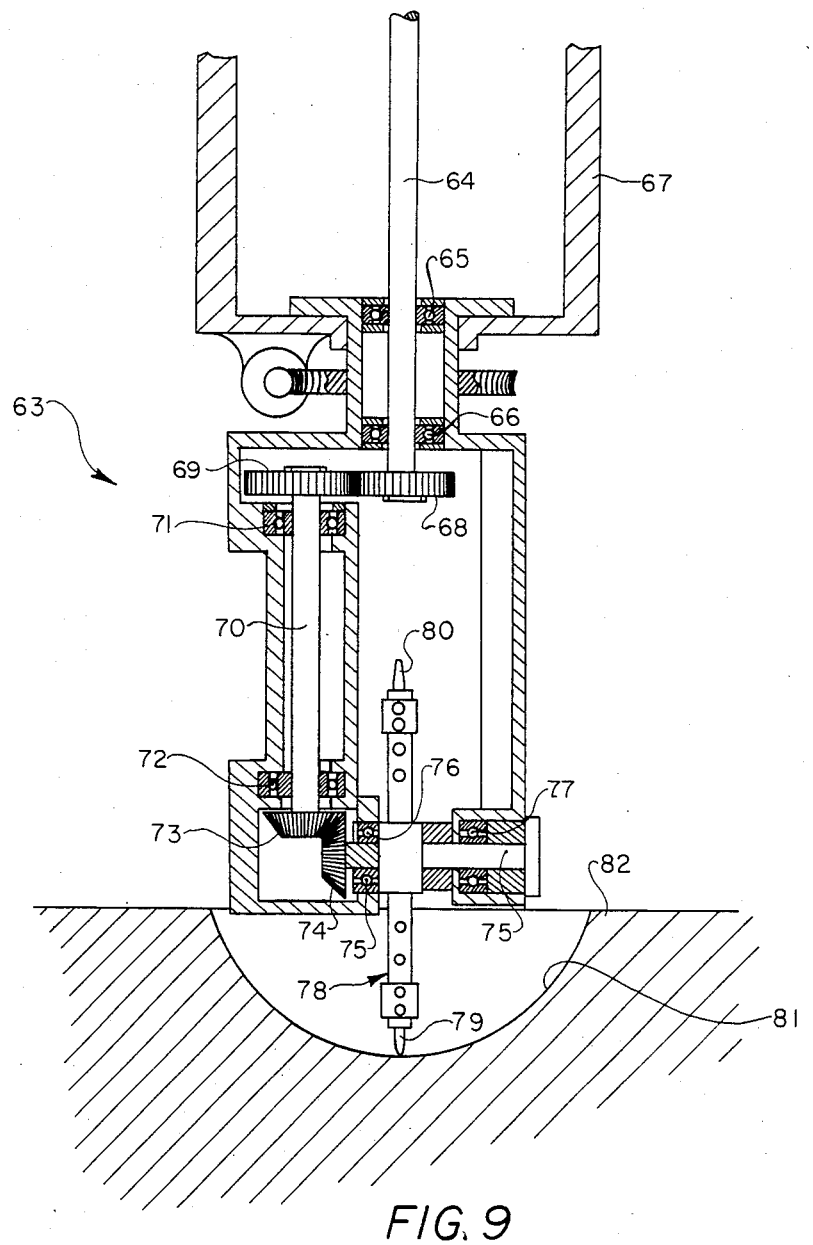
FIG. 9 is a longitudinal section of another embodiment of the tool saddle, showing an alternate cutting tool element in operation on workpiece.

With reference to FIG. 9, the tool saddle 63 has a main drive shaft 64 journaled in bearings 65 and 66 in the casing 67. A pinion gear 68 on the end of the drive shaft engages a gear 69 carried on a parallel intermediate shaft 70 journaled in bearings 71 and 72 retained within the casing. The end of the intermediate shaft carries a bevel pinion 73 which meshes with a cooperating bevel pinion 74 carried on the end of a cross shaft 25. The cross shaft is journaled in bearings 76 and 77 in the casing. A cutting tool element 78 is carried by the cross shaft for rotation in unison. Preferably, the tool element is double-ended and has respective cutting elements 79 and 80. With this arrangement, and with the articulated crossbeam herein disclosed, the cutting tool element may cut a hemispherical recess 81 in the workpiece 82.

Figure 10:
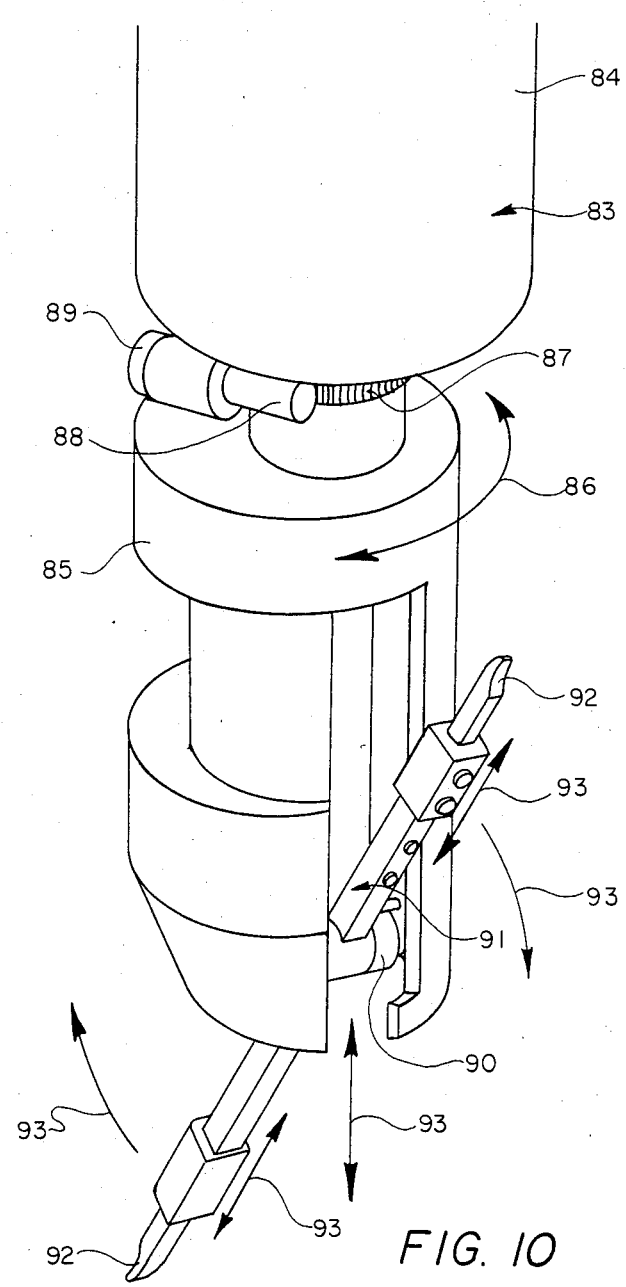
FIG. 10 is a perspective view of the tool saddle of FIG. 9, the arrows indicating the operation of the cutting tool element and the tool saddle.

With reference to FIG. 10, the tool saddle 83 has an upper casing 84 and a lower casing 85. The lower casing may oscillate relative to the upper casing as indicated by the arrows 86. The means for oscillation includes a worm wheel 87 engaging the worm 88 driven by the reversible motor 89. The lower casing has a cross shaft 90 for supporting a tool element 91. The tool element 91 is double ended and has a cutter 92 at each end thereof. The tool element has a variety of articulations as indicated by the arrows 93, and as previously described.

Figure 11:
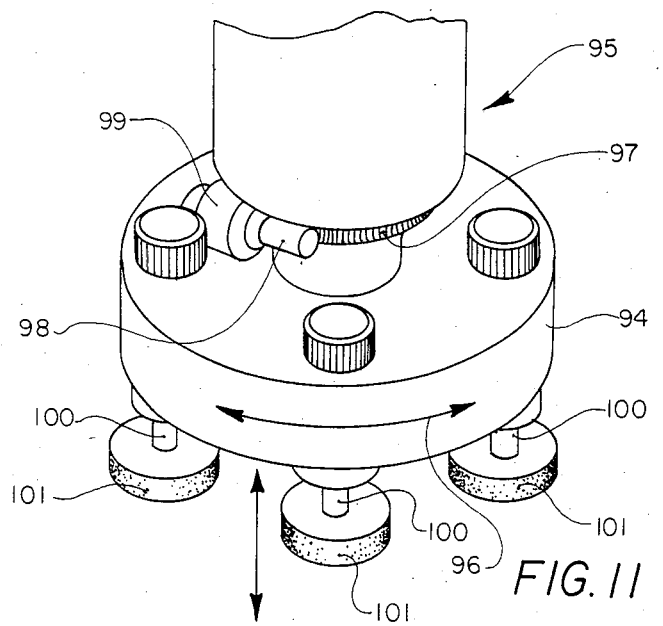
FIG. 11, is a perspective of yet another tool saddle, showing a plurality of depending abrasive or polishing heads.

With reference to FIG. 11, the lower casing 94 of the tool saddle 95 may oscillate as indicated by the arrow 96. The means for oscillation includes a worm wheel 97 engaging the worm 98 driven by a reversible motor 99. A plurality of stub shafts 100 are secured within the lower casing so as to extend therefrom. The stub shafts carry the abrasive elements 101 (such as grinding wheels, polishing discs, or the like).

Figure 12:
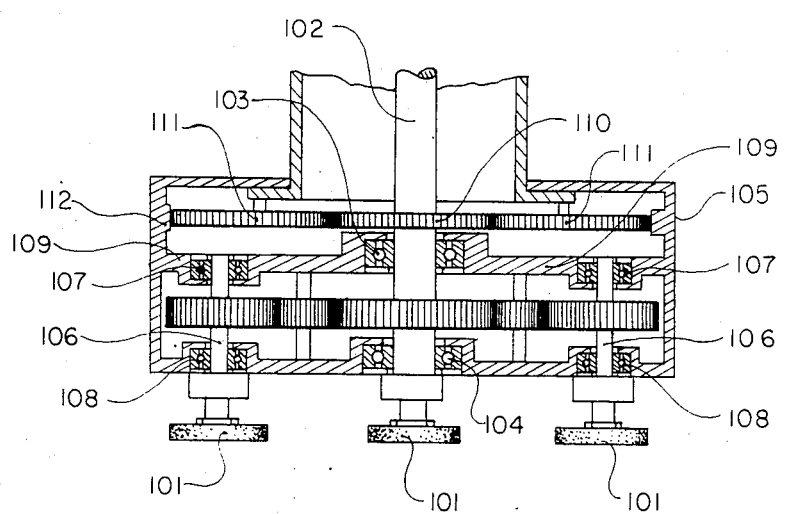
FIG. 12 is a longitudinal section of a tool saddle, corresponding substantially to a modification of the device of FIG. 11.
Figure 13:
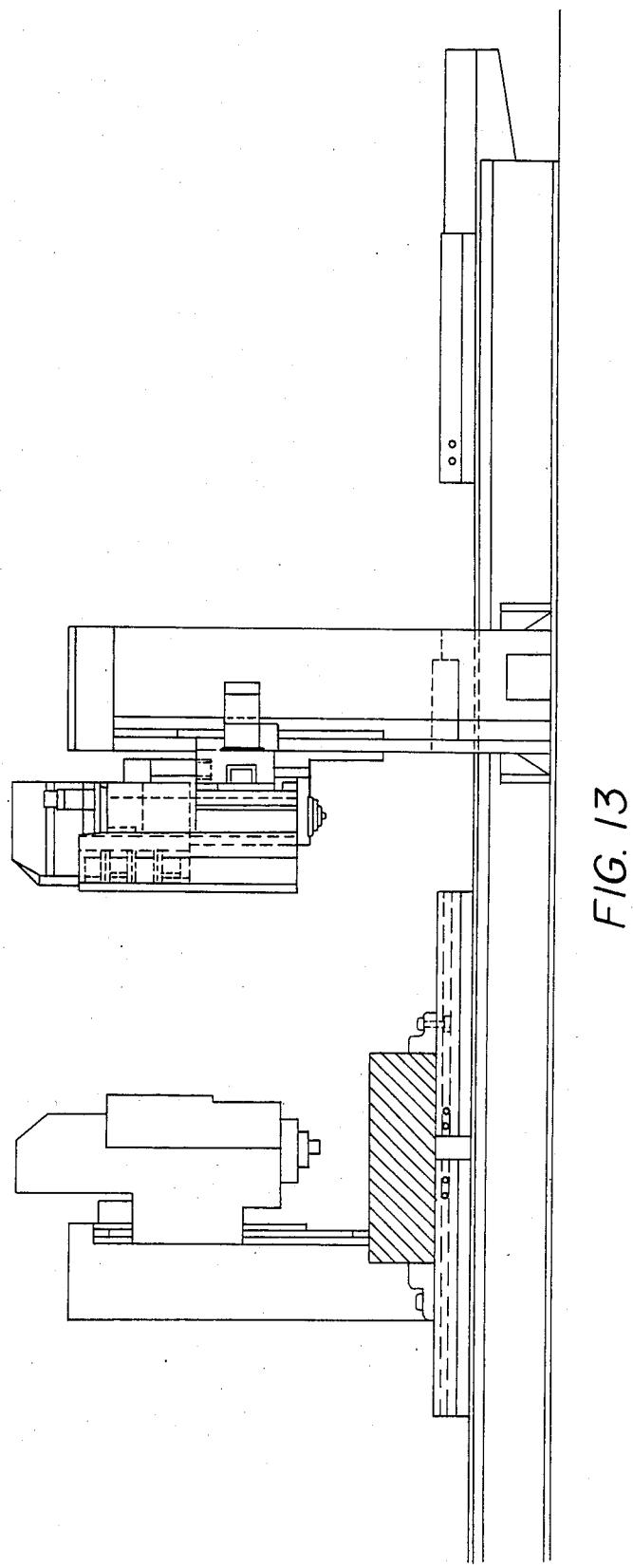
FIG. 13 is a side elevation of two machine tools equipped with the teachings of the present invention and confronting each other.
Figure 14:
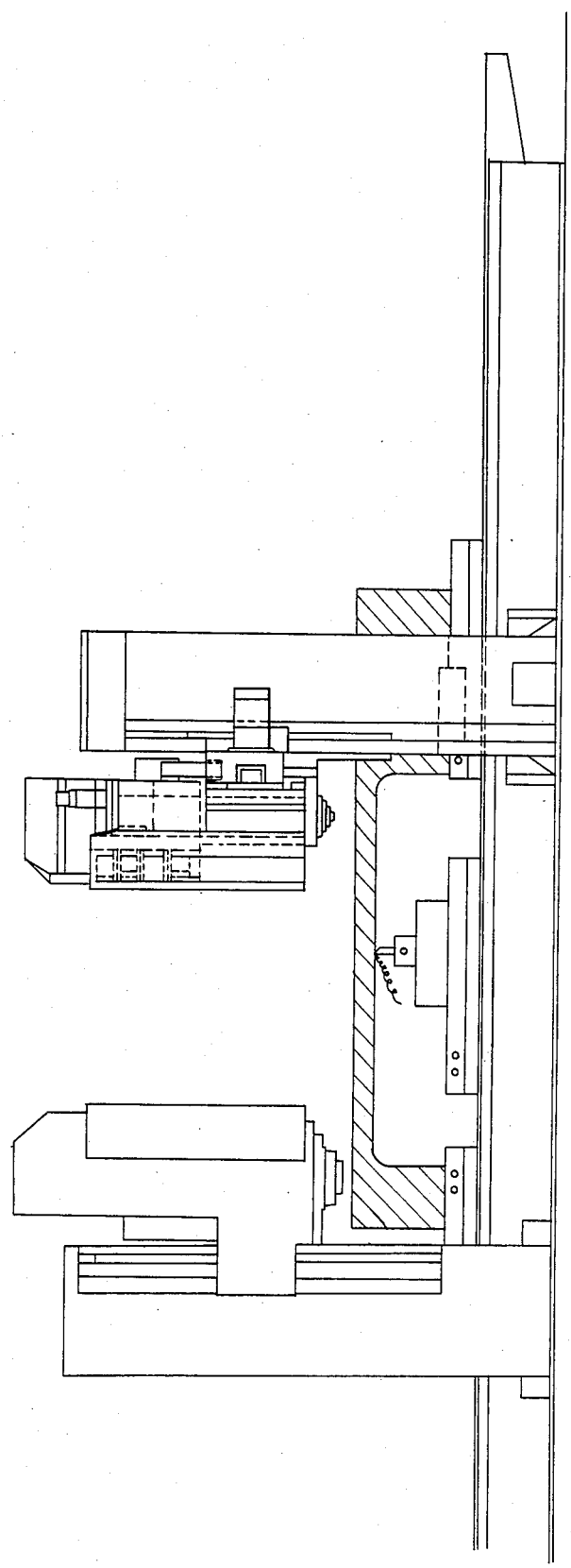
FIG. 14 is a side elevation of the machine tools of FIG. 13, showing a working table equipped with an additional tool element.
Figure 15:
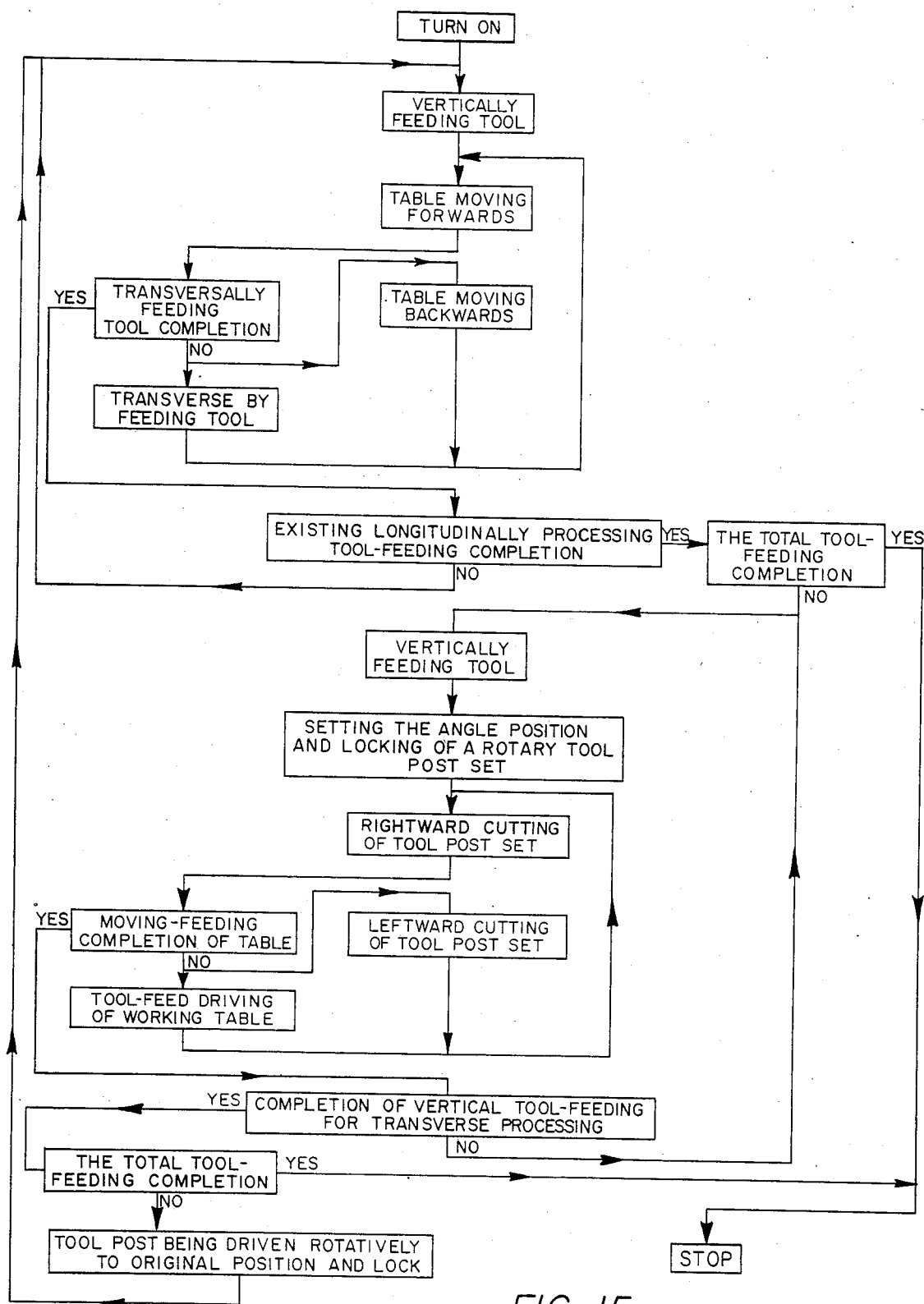
FIG. 15 is a flow chart which may be used in conjunction with the apparatus, embodiments and devices of the present invention disclosed herein.

With reference to FIG. 12, a main drive shaft 102 is journaled within bearings 103 and 104 in the housing 105. A plurality of parallel stub shafts 106 are journaled in bearings 107 and 108. These stub shafts carry the grinding wheels 101, polishing discs or the like. Bearings 107 are mounted in a web 109 found internally in the housing. The main drive shaft has a sun gear 110 which cooperates with planet gears 111; the planet gears in turn engage an internal ring gear 112 formed within the housing. In this manner, the entire housing may orbit about the axis of the main drive shaft.

The remaining drawing figures further illustrate the flexibility, versatility and inherent utility of the present invention.

Obviously, many modifications may be made without departing from the basic spirit of the present invention. Accordingly, within the scope of the appended claims, the invention may be practiced other than specifically disclosed herein.

What I claim is:

1. In a machine tool, the combination of a frame having a pair of vertical columns substantially parallel to each other, a carrier block mounted for sliding movement along a first vertical axis on each of the columns, means for vertically adjusting each carrier block on its respective column, a slide block mounted for sliding movement in each of the carrier blocks about a second horizontal axis perpendicular to the first axis, a longitudinal crossbeam means disposed between the pair of vertical columns and having respective end portions, a first universal joint between one of the end portions of the crossbeam means and one of the slide blocks, a second universal joint between the other end portion of the crossbeam means and the other slide block, whereby the crossbeam means may articulate between the respective carrier blocks and between the pair of vertical columns, a tool saddle carried by the crossbeam means for sliding movement longitudinally thereof, means for adjusting the longitudinal position of the tool saddle relative to the crossbeam means, a tool element carried by the saddle for engagement with a workpiece, and means for driving the tool element.

2. The combination of claim 1, wherein the vertical columns have respective upper portions which are connected by a bridge.

3. The combination of claim 1, wherein each of the vertical columns is provided with two raised parallel guide surfaces and a center recess therebetween, wherein the respective carrier block is guided on the guide surface and has a central portion received within the center recess, wherein at least one vertical guide rod is received in the center recess and passes through the carrier block, and wherein a vertical worm screw is disposed within the center recess and engages the carrier block for vertically adjusting the carrier block on its respective column.

4. The combination of claim 1, wherein the means for adjusting the longitudinal position of the tool saddle on the crossbeam means comprises at least one longitudinal guide rod and a worm screw carried by the crossbeam means and engaging the tool saddle.

5. The combination of calim 1, wherein the longitudinal crossbeam means is provided with a contractile structure positioned on at least one end of the said crossbeam means.

6. The combination of claim 1, wherein the longitudinal crossbeam means is provided with a contractile structure positioned at both ends of the crossbeam means.

7. The combination of claim 6, wherein the contractile structure includes a dovetail structure, whereby the contractile structure is secured to the crossbeam means for sliding movement thereon.

8. In a machine tool, the combination of a frame having a pair of vertical columns postioned substanially parallel to each other, a carrier block mounted for sliding movement along a first vertical axis on each of the columns, means for vertically adjusting the carrier block on its respective columns, a slide block mounted for sliding movement in each of the carrier blocks about a second horizontal axis perpendicular to the first axis, a longitudinal crossbeam means disposed between the pair of vertical columns and having respective end portions, a universal joint postioned between each of the end portions of the crossbeam means and each of the sliding blocks, whereby the crossbeam means may articulate between the carrier blocks and between the vertical columns, a tool saddle carried by the crossbeam means for sliding movement longitudinally thereof, means for adjusting the longitudinal position of the tool saddle relative to the crossbeam means, a tool element carried by the saddle for engagement with a workpiece, and means for driving the tool element.

9. In a machine tool, the combination of a frame having a pair of vertical columns substanially parallel to each other, a carrier block mounted for sliding movement upon a first vertical axis on each of the columns, means for vertically adjusting the carrier block on its respective columns, a slide block mounted for sliding movement in each of the carrier blocks about a second axis which is horizontal and perpendicular to the first axis, a longitudinal crossbeam means disposed between the pair of vertical columns and having respective end portions, a tool saddle carried by the crossbeam means for sliding movement longitudinally thereof, means for adjusting the longitudinal position of the tool saddle relative to the crossbeam, a tool element carried by the saddle for engagement with a workpiece, means for driving the tool element, and articulation means located at each end of the crossbeam for articulating the crossbeam and hence the tool saddle in both horizontal and vertical planes, independently, and relative to the vertical columns.

10. In a machine tool having a pair of vertical columns, a horizontal crossbeam therebetween, a tool saddle carried by the crossbeam, and a cutting tool element carried by the tool saddle for engaging a workpiece supported on a table positioned between the columns, the improvement which comprises, in combination, articulation means located at each end of the crossbeam for articulating the crossbeam and hence the tool saddle and cutting tool element carried thereby, relative to the vertical columns, and in mutually perpendicular horizontal and vertical planes, independently thereof.

11. In a machine tool, the combination of a frame having a pair of vertical columns substanially parallel to each other, a carrier block mounted for sliding movement along a first vertical axis on each of the columns, means for vertically adjusting each carrier block on its respective column, a slide block mounted for sliding movement in each of the carrier blocks about a second horizontal axis perpendicular to the first axis, a longitudinal crossbeam means disposed between the pair of vertical columns and having respective end portions, a first vertical joint between one of the end portions of the crossbeam means and one of the slide blocks, a second universal joint between the other end portion of the crossbeam means and the other slide block, whereby the crossbeam means may articulate between the respective carrier blocks and between the pair of vertical columns, a tool saddle carried by the crossbeam means for sliding movement longitudinally thereof, means for adjusting the longitudinal position of the tool saddle relative to the crossbeam means, a tool element carried by the saddle for engagement with a workpiece, and menas for driving the tool element.

12. The combination of claim 11, wherein the vertical columns have respective upper portions which are connected by a bridge.

13. The combination of claim 12, wherein each of the vertical columns is provided with two raised parallel guide surfaces and a center recess therebetween, wherein the respective carrier block is guided on the guide surface and has a central portion received within the center recess, wherein at least one vertical guide rod is received in the center recess and passes through the carrier block, and wherein a vertical worm screw is disposed within the center recess engages the carrier block for vertically adjusting the carrier block on its respective column.

14. The combination of claim 11, wherein the means for adjusting the longitudinal position of the tool saddle on the crossbeam means comprises at least one longitudinal guide rod and a worm screw carried by the crossbeam means and engaging the tool saddle.

15. The combination of claim 11, wherein the longitudinal crossbeam means is provided with a contractile structure positioned on at least one end of the said crossbeam means.

16. The combination of claim 11, wherein the longitudinal crossbeam means is provided with a contractile structure positioned at both ends of the crossbeam means.

17. The combination of claim 16, wherein the contractile structure includes a dovetail structure, whereby the contractile structure is secured to the crossbeam means for sliding movement thereon.

* * * * *